Figure 1:
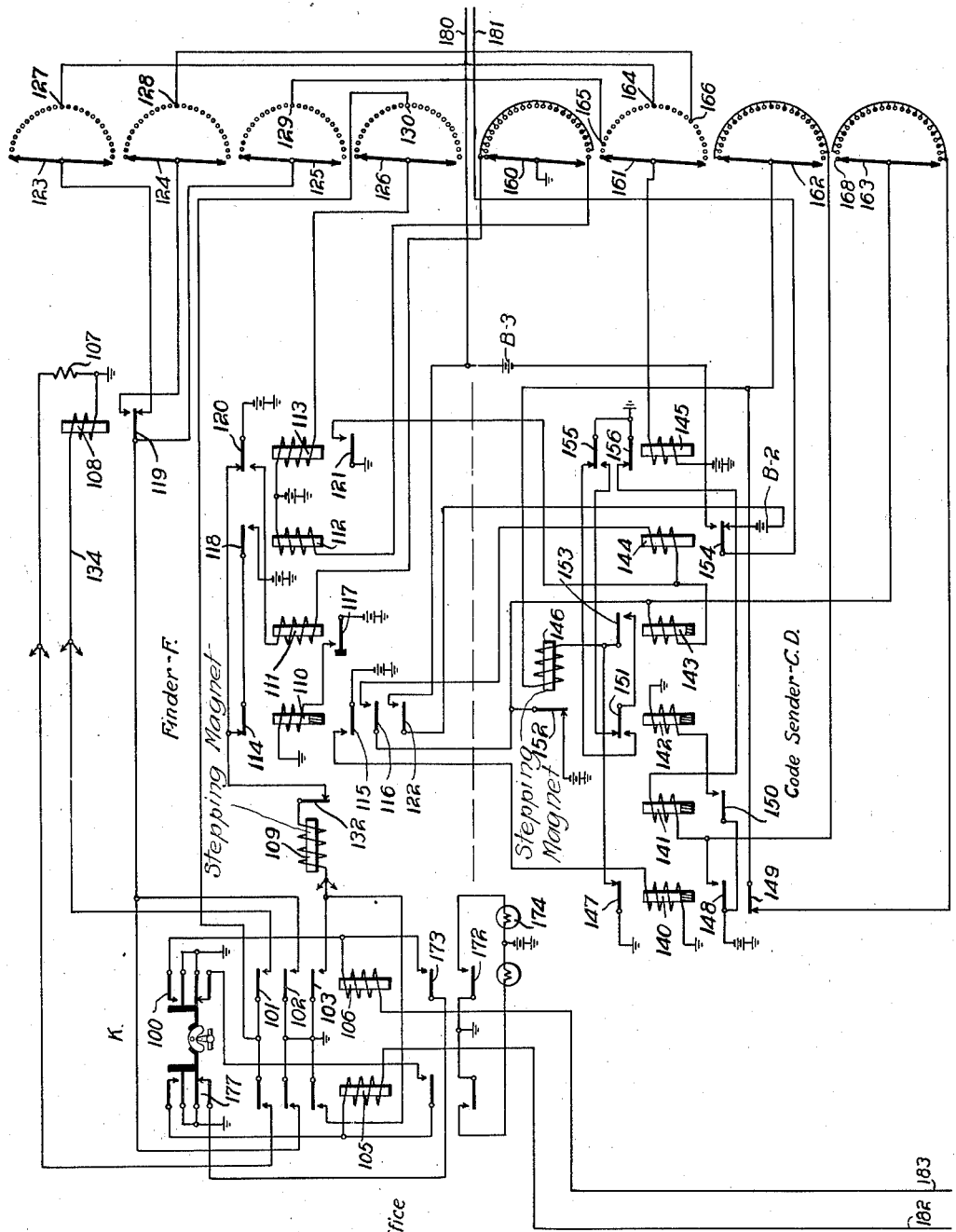

Jan. 21, 1930.   J. E. GARDNER   1,744,220
SUPERVISORY CONTROL SYSTEM

Filed Oct. 24, 1923    8 Sheets-Sheet 4

Substation

WITNESSES:

INVENTOR
John E. Gardner.
BY
ATTORNEY

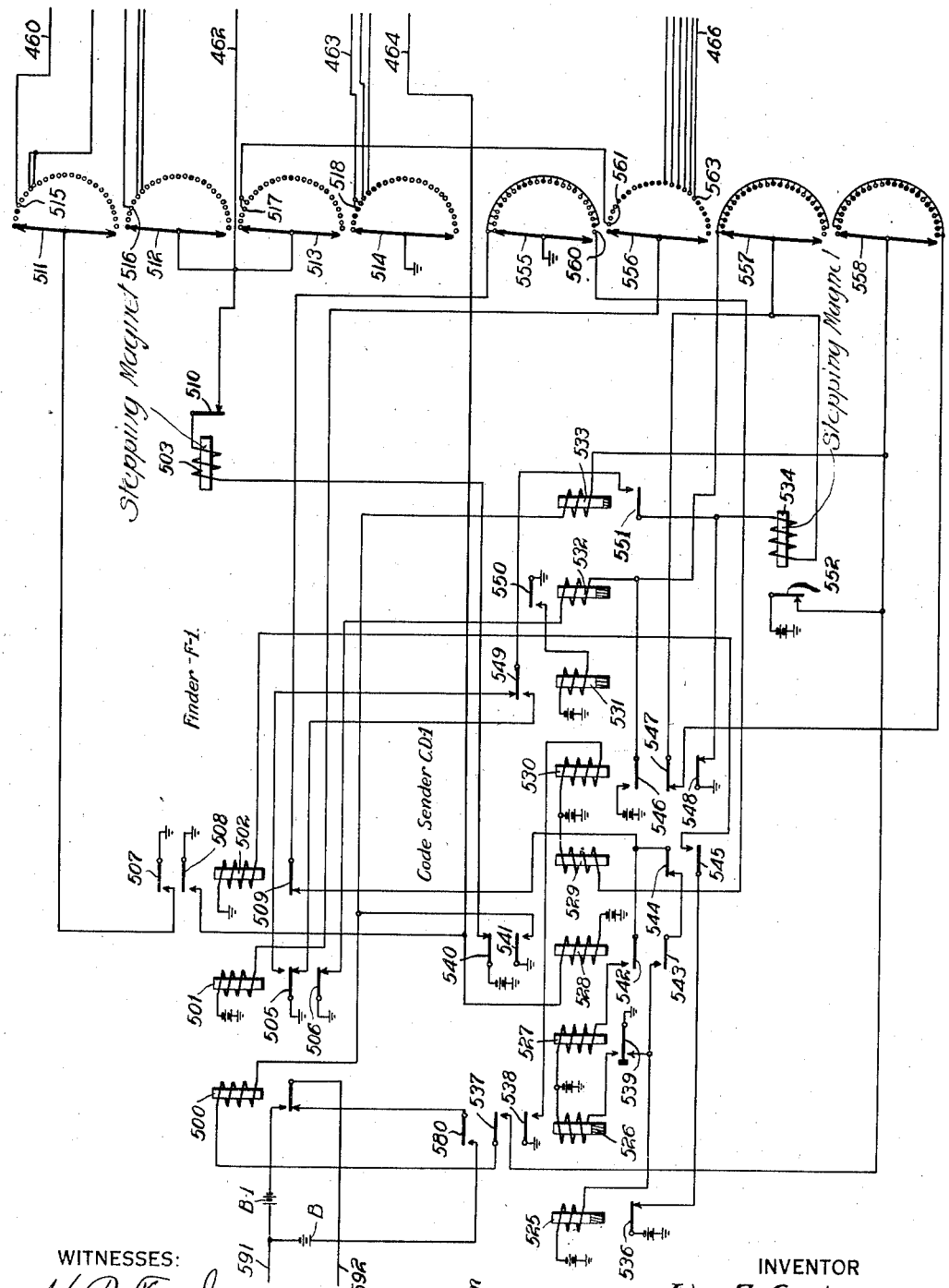

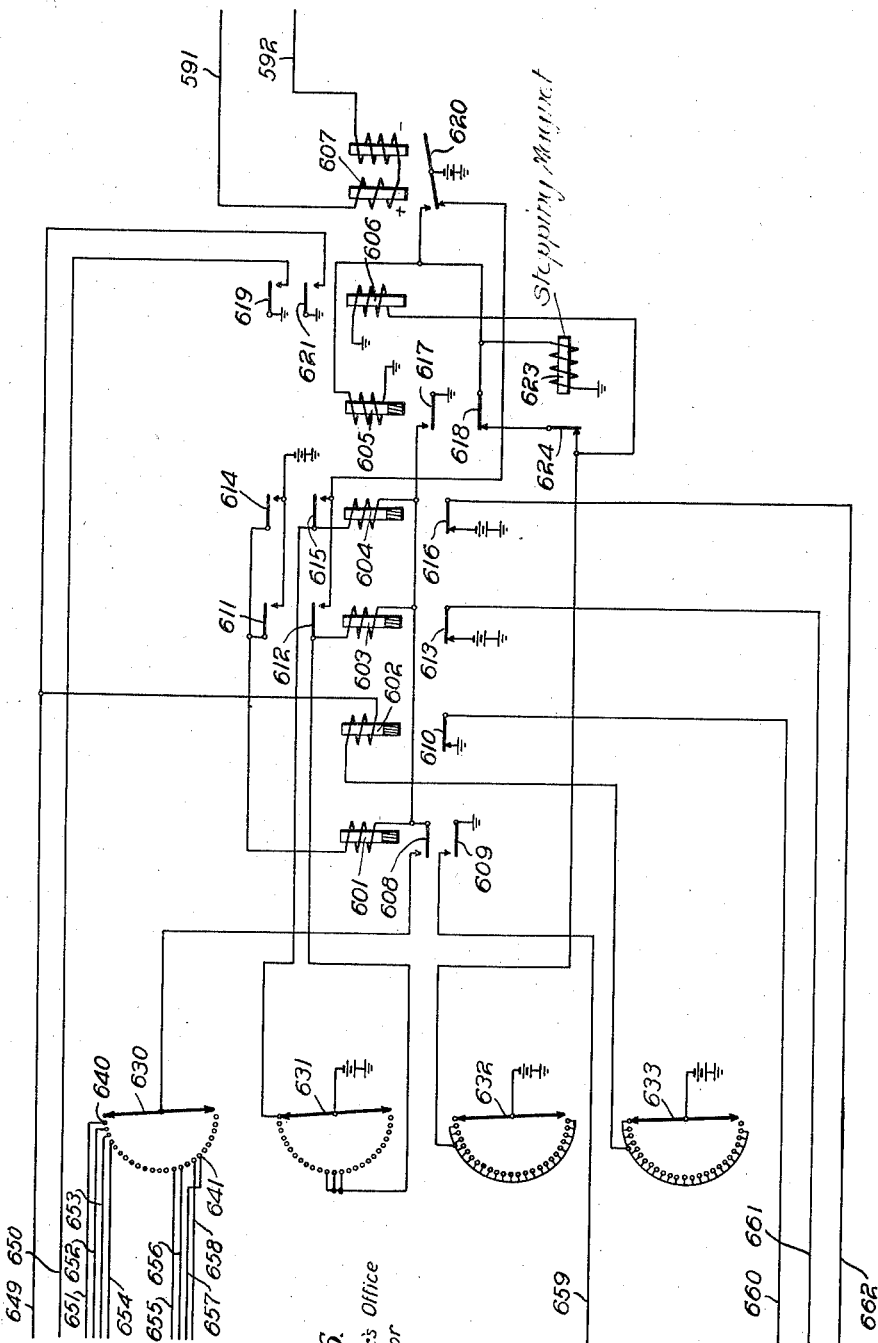

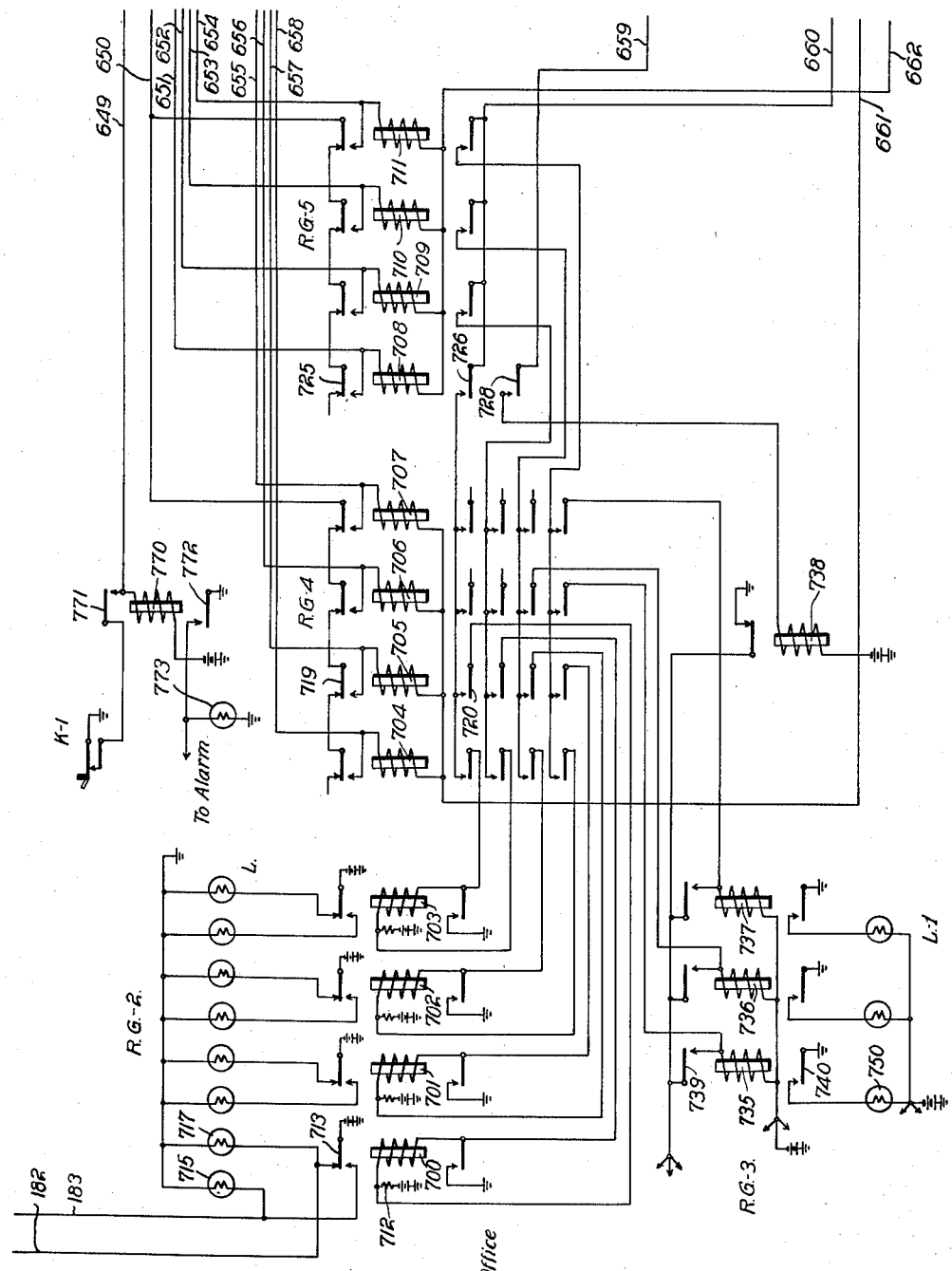

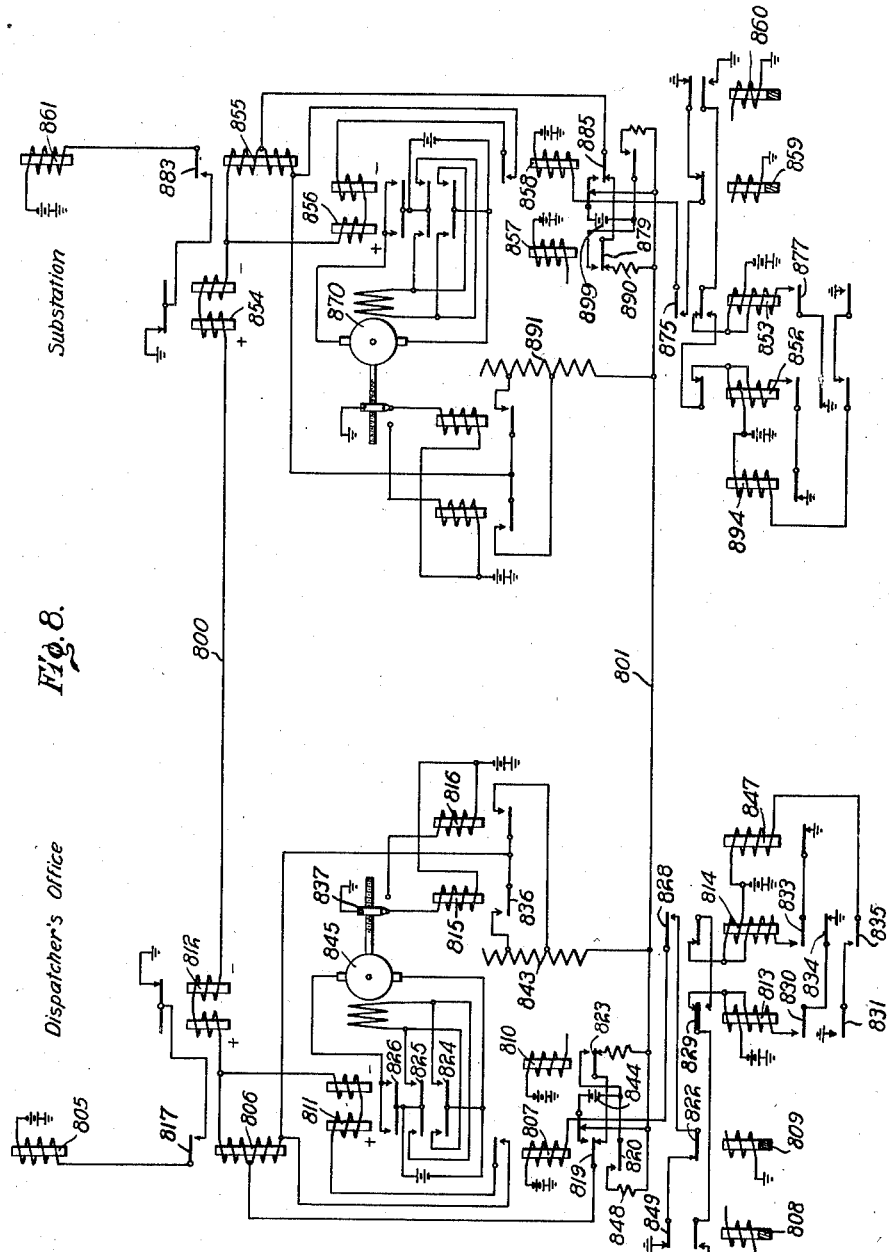

Patented Jan. 21, 1930

1,744,220

UNITED STATES PATENT OFFICE

JOHN E. GARDNER, OF WILKINSBURG, PENNSYLVANIA, ASSIGNOR TO WESTINGHOUSE ELECTRIC & MANUFACTURING COMPANY, A CORPORATION OF PENNSYLVANIA

SUPERVISORY CONTROL SYSTEM

Application filed October 24, 1923. Serial No. 670,466.

My invention relates, in general, to systems for supervising and controlling electrical equipment from a remote point and, more particularly, to the supervising and controlling of substations in an electrical system of distribution.

One object of my invention is the provision of novel and efficient circuit arrangements for remotely controlling power units in substations, whereby a load dispatcher located at a central point or control office may supervise and control all power or apparatus units in either manual or automatic substations of a complex electrical distributing system.

Another object of my invention is the provision of a common relay device for controlling the sending back to the dispatcher of a plurality of signals whereby the dispatcher is apprised of the load on each substation.

Another object of my invention is to provide improved circuit arrangements whereby it is impossible to secure a false operation upon improper setting of the connector switch in the dispatcher's office or substation.

Another object of my invention is the provision of control circuits for the connector switches by using reverse-current control impulses to secure faster operation than has been possible heretofore.

Another object of my invention is to provide improved means for operating an automatic switch at each end of a two-conductor trunk line simultaneously.

A further object of my invention is to provide an improved duplex or quadruplex impulsing arrangement whereby the balancing of the artificial line circuit, which is usually done manually, is accomplished automatically.

There are other objects of my invention which, together with those set forth, will be described hereinafter with reference to the accompanying drawings.

In the present instance, I have shown my invention applied to an electrical system of distribution having automatic substations, though it is by no means limited to this use.

In accordance with my invention, I have provided a group of supervisory lamps and controlling keys for each substation to be used for supervising and controlling the operation of power units therein. A two-wire trunk line connects the dispatcher's office to each substation. Associated with each end of each trunk line is a directively controlled automatic switch. Also, in each substation, there is an automatic sending equipment associated with the trunk line. In the dispatcher's office, automatic impulse sending devices are provided which are controlled by the operation of the keys.

When one of the apparatus units at a substation changes its condition, under automatic control, an automatic impulse sender in the substation operates to send a series of impulses over the trunk line in accordance with the apparatus unit operated. Responsive to these operations, the automatic directively controlled switch, associated with the trunk line in the dispatcher's office, is operated to control the operation of the supervisory signals. The operation of these signals serves to apprise the dispatcher of the operation of the apparatus unit at the substation. In order to operate an apparatus unit in any substation, the dispatcher actuates a key corresponding to the operation of the apparatus unit desired. This operation causes the automatic impulse sending device in the dispatcher's office to function to send a code of impulses over the trunk line to operate the directively controlled switch in the selected substation. As a result of the operation of the switch, the proper apparatus unit is operated, as desired, by the dispatcher.

Referring now to the drawings comprising Figures 1 to 7, inclusive, I have shown, by means of conventional circuit diagrams, sufficient of the circuits and apparatus to enable my invention to be readily explained and understood.

Figs. 1 to 7, inclusive, when placed side by side, with the corresponding lines at the end thereof in alinement, illustrate the circuits of my complete system. Figs. 1, 6 and 7 are diagrammatic views of the equipment located in the load dispatcher's office, while Figs. 2, 3, 4 and 5 are similar views of the selective and controlling equipment in an automatic substation of the system.

Fig. 8 discloses a modification of my invention to enable impulses to be sent over a two-wire trunk line in both directions simultaneously.

Referring now more specifically to Fig. 1, in the upper left-hand corner thereof is shown a key K. This key is one of several groups of keys and is of the ordinary double-throw type automatically returning to normal after being actuated in either direction. A switch F is a finder switch of the usual rotary type, the wipers of which move in a forward direction only. The finder switch is provided with four wipers 123 to 126, inclusive, each of which is adapted to engage a contact bank comprising twenty-five contact members. The wipers of the finder switch F have no normal position. The mechanical construction of the switch is similar to that shown in the Patent 1,107.153 to Clement.

The switch CD is a code-sending switch similar in mechanical construction to the finder switch F. On account of differences in circuit design, the switch CD performs different functions than the switch F and is rotated to normal position at the end of each operation.

Figure 2:
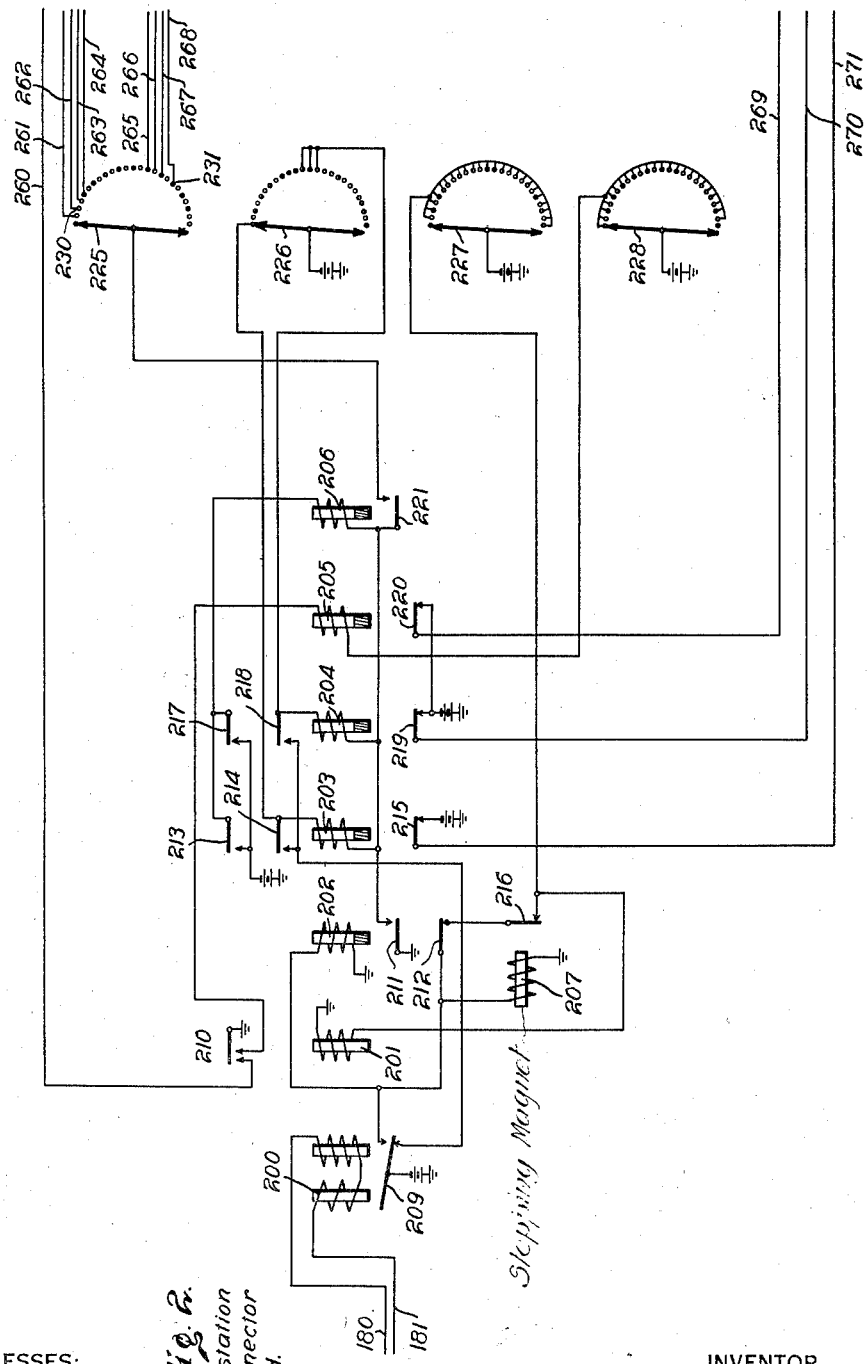

In Fig. 2 there is shown a connector switch H. This switch is of the same general mechanical construction as the finder switch F. However, its circuits have been so designed as to enable it to be directively operated.

Figure 3:
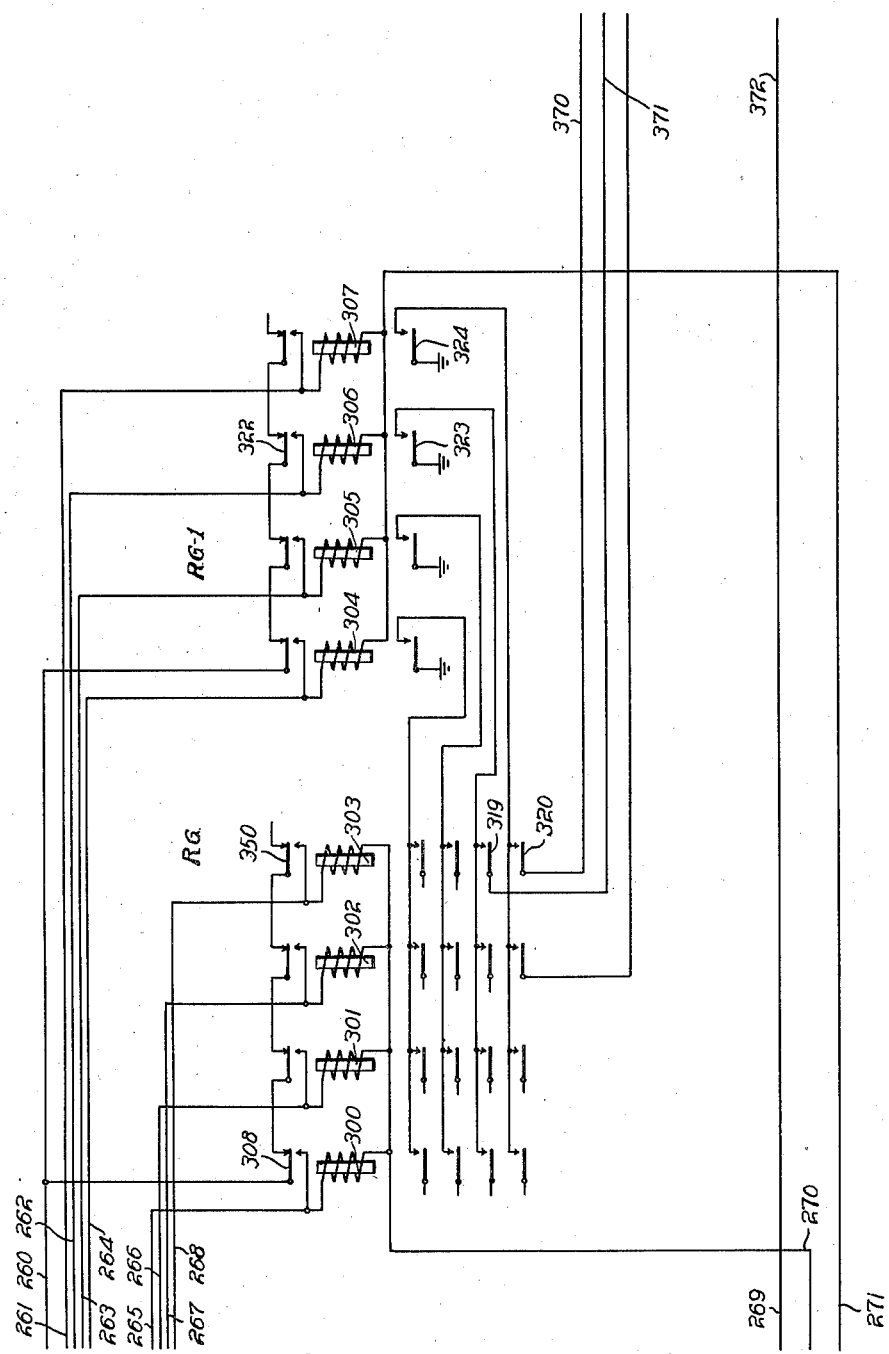

Fig. 3 shows two groups RG—1 and RG of selecting relays, the relay group RG—1 being the primary selecting group and the relay group RG being the secondary selecting group.

Figure 4:
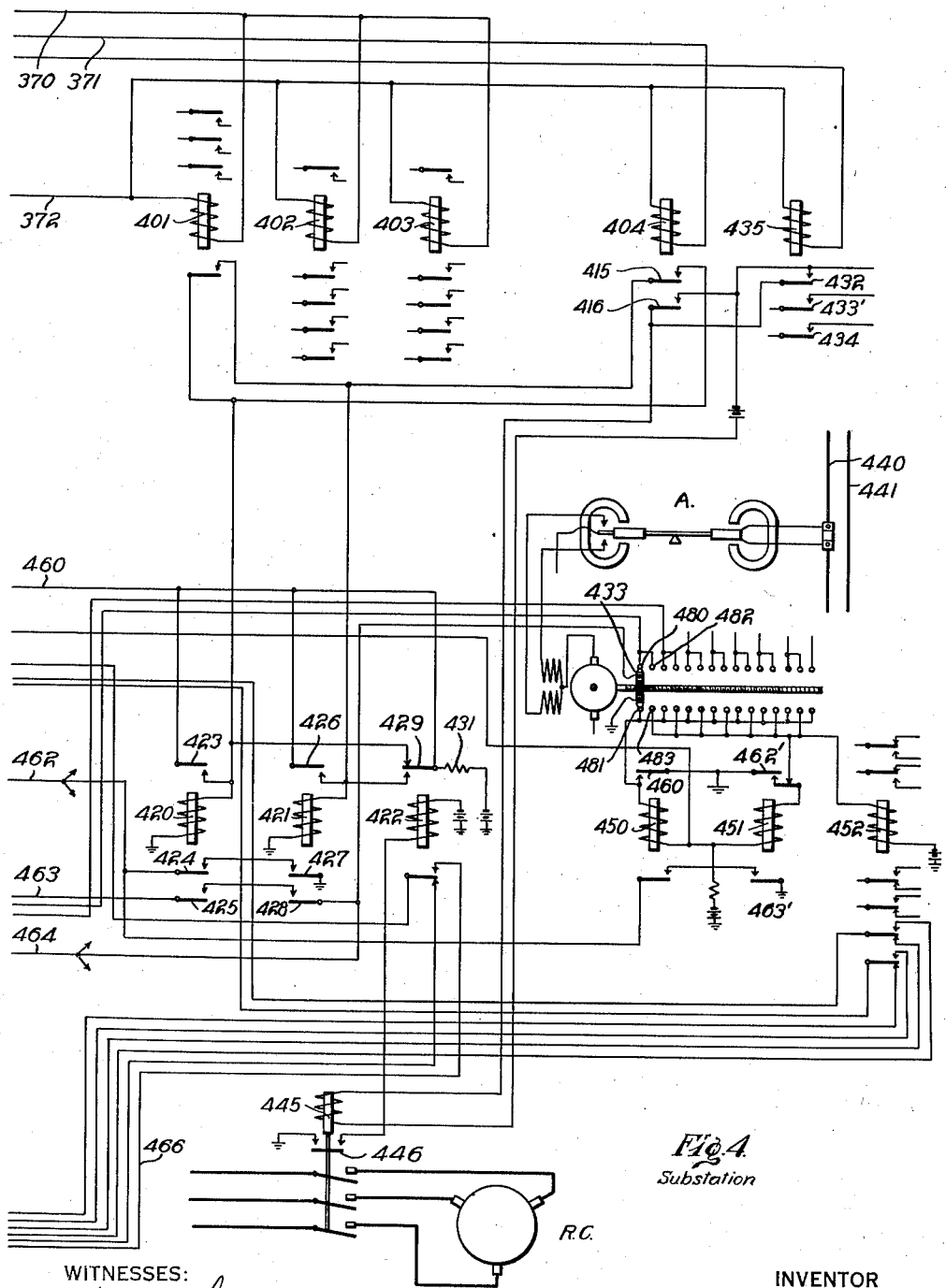

The relays 401 to 404, inclusive, and the relay 435, in Fig. 4, are those selected by the operation of the selective relays of Fig. 3. The contactor or switch 445 may be any one of the contactors in the substation. As shown, the contactor 445, in conjunction with other apparatus (not shown), serves to control the starting of the rotary converter RC of the substation. The relays 420 to 422, inclusive, are provided for the purpose of controlling the operation of the finder switch F—1 of Fig. 5 in accordance with the position of the contactor 445. An ammeter A of the well-known Kelvin balance type is connected to an ammeter shunt in the direct-current supply busses 440 and 441 and it operates to shift a contact member 433 in accordance with the load on the substation.

In Fig. 5 is shown a finder switch F—1 and a code-sending switch CD—1. These switches are very similar to the switches F and CD previously described.

In Fig. 6 is shown a connector switch H—1 similar to the connector switch H described above.

The relay groups RD—4 and RD—5 shown in Fig. 7 are selective relays similar to those shown in Fig. 3. The relays 700 to 703, inclusive, control the operation of supervisory lamps L. The relay group RG—3 comprises relays for controlling load-indicating lamps L—1.

In Fig. 8, I have shown an arrangement for sending code impulses in both directions simultaneously over one pair of wires. The circuit is similar to an ordinary duplex telegraph circuit, except that it is arranged to automatically balance the resistance of the artificial lines associated therewith.

Having briefly described the apparatus shown in the drawings, I will now explain its detailed circuit operation. In order to do this, it may be assumed that the contactor 445 closes. The closure of this switch or circuit breaker may occur in response to the operation of the ordinary automatic controlling equipment of the substation (not shown).

When the contactor 445 operates, a circuit is closed which may be traced from ground by way of the contact members 446, and the winding of a relay 422 to battery. The relay 422 is energized by this circuit and, upon operating, at armature 429 closes a circuit for a relay 421. The relay 421 is energized and attracts its armatures. Prior to this time, the relay 420 has been energized as a result of the relay 422 being inoperative. When the relay 422 was energized, the relay 420 did not retract its armatures, because of the fact that it had established a locking or holding circuit for itself at its armature 423 from ground through the winding of relay 420, front contact and armature 423, resistance 431 and battery to ground.

When the relay 421 is energized, it operates to establish a locking circuit for itself at its armature 426 and to close a circuit which may be traced from ground by way of the armature 427 and its front contact, the front contact and armature 424 of the relay 420, common conductor 462, the back contact and armature 510, the winding of a stepping magnet 503, and the back contact and armature 540 of a relay 528 to battery. The stepping magnet 503 is immediately energized to place its pawl in position to actuate the switch shaft upon its deenergization and, at its armature 510, to open its own circuit. As the magnet 503 interrupts its own circuit, it intermittently operates to advance the switch wipers 511 to 514, inclusive, step by step, until said wipers are brought into engagement with the bank contact members 515 to 518, inclusive. In this position, a circuit is completed extending from ground by way of the wiper 514 and its associated bank contact 518, conductor 463, armature 425 and its front contact, the front contact and armature 428, common conductor 464, and winding of a relay 528 to the battery. The relay 528 is immediately operated over this circuit.

As a result of the energization of the relay 528, the circuit of the stepping magnet 503 is opened at armature 540 of the relay 528 and, at armature 541, a circuit is completed which extends from ground by way of the said armature and its front contact, through the winding of a slow-acting relay 533, the back contact and the armature 552 to battery. Another result of the energization of the relay 528 is that a circuit is closed from ground by way of a wiper 555 and its associated bank contact, an armature 509 and its back contact, an armature 542 and its front contact, and the winding of a relay 527 to the battery. Another circuit in parallel with that described above, except that it goes by way of an armature 544 and its back contact and an armature 543 and its front contact, may be traced for energizing a relay 525. The relay 527, upon operating, at its armature 539 closes a circuit for a relay 526.

At this point, it may be well to mention the peculiar construction of the armature 539 of the relay 527. The armature 539 is weighted and is so constructed that, when the relay 527 is deenergized, the armature 539 vibrates for some time on account of its momentum. The adjustment between the front and back contacts is so made that the armature 539, in decreasing the amplitude of its operation, first permanently opens the circuit of the relay 525. The operation of the relay 525 is without particular function at the present time.

The relay 526, upon operating, at its armature 538 closes a circuit for the relay 530 and at its armature 537 establishes a circuit which extends from ground by way of the armature 541 and its front contact, through the winding of a repeating relay 500, the armature 537 and its front contact, and the back contact and armature 552 of a stepping magnet 534 of the code-sending switch CD—1 to battery. Still another result of the energization of the relay 526 is that, at its armature 580, the battery B is placed in the line circuit. This operation prepares a circuit for causing the retraction of the armature of the polarized relay 607 of the connector H—1 as will appear.

The relay 530 is energized from the previously traced circuit and, upon operating, closes a circuit at its armature 546, which extends from the battery, by way of the front contact and the said armature, the winding of the slow-acting relay 532, the back contact and an armature 506 to ground. The relay 532, upon operating, at armature 550 closes a circuit for a slow-acting relay 531. By the operation of the relay 531, a circuit is completed which extends from ground by way of the armature 505 and its back contact the front contact and the armature 549, the front contact and the armature 551, through the winding of the magnet 534, the wiper 557 and its associated bank contact, and thence to battery, by way of the armature 546 and its front contact. The magnet 534 is energized over this circuit and operates to place its pawl in such position as to operate the switch shaft upon the deenergization of the magnet. Another result of the energization of the magnet 534 is that the circuit of a slow-acting relay 533 is opened as is, also, the circuit of a repeating relay 500.

When the circuit of the relay 500 is closed, as previously described, this relay operates. As a result of this operation, a circuit is closed over conductors 591 and 592 for the polarized relay 607 of the connector switch H—1. It will be noted that this circuit includes the battery B—1. The line relay 607 is a polarized relay and is adapted to be operated by the current from the battery B—1.

Upon operating, the relay 607, through its armature 620, completes a circuit for a slow-acting relay 605 in parallel with a stepping magnet 623. Upon attracting its armatures, the relay 605 closes a circuit for a slow-acting relay 604 at its armature 617 from ground, front contact and armature 617, winding of relay 604, first contact and wiper 631 and battery to ground. The relay 604, upon operating, at its armature 615, prepares a holding circuit for itself, removes battery from a conductor 662 at its armature 616, and at its armature 614, closes a circuit for a slow-acting relay 601 from ground, through battery front contact and armature 614, winding of relay 601, and front contact and armature 617 to ground. The energization of the relay 601 merely prepares certain circuits which function later. The energization of the magnet 623 places its pawl in position to operate the switch shaft upon the deenergization of the magnet.

Now, when the circuit of the relay 500 in the code-sending switch CD—1 is opened by the energization of the magnet 534, previously described, this relay is deenergized to open the circuit of the line relay 607 of the connector H—1 and to close another circuit for the relay including the battery B. The battery B is so connected that, when included in the line circuit, the current flow is in the opposite direction to the current flow when the battery B—1 is connected in the line circuit, and, consequently, the flux produced by the current traversing the relay winding causes the armature 620 to be operated in the reverse direction. The armature of the relay 607 is thus retracted quickly. This retraction occurs much more quickly than if the circuit of the relay 607 were merely opened as the flux produced by the current traversing the winding of the relay 607, with its battery B in the circuit, actually forces the armature 620 away. The retraction of the armature 620 opens the circuit of the slow-acting relay 605 and also the circuit of the magnet 623. The retraction of the armature of the magnet 623 causes its associated pawl to advance the switch shaft carrying the switch wipers 630 to 633, inclusive, into engagement with the first set of bank contacts. The operation of the connector H—1 from its normal position closes a circuit for a relay 606 at wiper 632. The relay 606, upon operating, places ground upon a conductor 650 at the armature 619, and, at the armature 621 closes a circuit for a relay 770. The relay 770, upon attracting its armatures, closes a locking circuit for itself at the armature 771 and, at the armature 772, closes a circuit for an audible alarm (not shown) and the alarm lamp 773. The attention of the load dispatcher is thus drawn to the fact that an operation has been performed at the substation. The grounding of conductor 649 also closes a circuit for the relay 602 at wiper 633 which operates to remove ground from the conductor 660 at armature 610.

Referring now to the code-sending switch CD—1, it will be remembered that the energization of the stepping magnet 534 also opened the circuit of the slow-acting relay 533. After a short interval, this relay is deenergized to open the circuit of the stepping magnet 534 at the armature 551.

The magnet 534 is immediatly deenergized to advance the wipers 555 to 558, inclusive, into engagement with the first set of bank contacts and, at armature 552, closes the circuit of the repeating relay 500 and also the circuit of the relay 533. The relay 533 operates to close the circuit of the stepping magnet 534 and the repeating relay 500, which is energized to close the circuit of the line relay 607 to the connector H—1. The alternate operation of the slow-acting relay 533 and the stepping magnet 534 continues until the wipers 555 to 558, inclusive, are brought into engagement with the bank contact set which includes the contact 561. When this occurs, a circuit is completed extending from ground by way of the armature 427 and its front contact, the front contact and the armature 424, common conductor 462, wiper 513, bank contact 517, bank contact 561, wiper 556, and the winding of the relay 501 to battery.

The relay 501 is energized over this circuit and operates at its armature 505 to open the circuit of the stepping magnet 534 and to prepare another circuit at the front contact of this armature for the said magnet. An additional result of the operation of the relay 501 is that the circuit of the slow-acting relay 532 is opened at armature 506. After a short interval of time, the relay 532 is deenergized to open the circuit of the slow-acting relay 531. Upon the retraction of the armature 549 of the relay 531, a circuit is completed which extends from ground by way of the armature 505 and its front contact, back contact and armature 549, front contact and armature 551, through the winding of the stepping magnet 534, wiper 557 and its associated bank contact, and thence to the battery, by way of the armature 546 and its front contact.

The magnet 534 is energized over this circuit and actuates its armatures to position its associated pawl, to open the circuit of the slow-acting relay 533, and also to open the circuit of the repeating relay 500. The slow-acting relay 533 is deenergized, after an interval, to open the circuit of the stepping magnet 534, which is deenergized, to again close the circuit of the slow-acting relay 533 and to open the circuit of the repeating relay 500. The alternate operation of the relay 533 and the magnet 534 again occurs until the wipers 555 to 558, inclusive, are advanced into engagement with the bank contact set which includes the bank contact 563.

During the operation of the code-sending switch CD—1, while its wipers were rotated in search of the contact set which includes the bank contact 561, the circuit of the relay 500 was intermittently opened and, consequently, the line relay 607 of the connector H—1 retracted its armature a plurality of times. It is true that the time of operation of the slow-acting relay 533 indirectly controls the speed of operation of the repeating relay 500. It is also true that, at each retraction of the armature of the relay 607, the circuit of the slow-acting relay 605 is opened. In order to obviate any false operation, which would occur were the relay 605 to be deenergized between deenergizations of the relay 533 in the switch CD—1, the time constant of the slow-acting relay 533 is made materially faster than the time constant of the slow-acting relay 605.

Upon each retraction of the armature 620 of the line relay 607, when this relay is deenergized, the circuit of the slow-acting relay 605 is opened and also the circuit of the stepping magnet 623. The magnet 623 is thus deenergized a plurality of times to advance the wipers 630 to 633, inclusive, into engagement with the bank contact set which corresponds to the number of impulses sent over the trunk line, as determined by the number of steps that the code-sending switch CD—1 has taken to find the bank contact set including the contact 561. It will be assumed that the bank contact set selected by the connector H—1 includes the contact 640.

As the wipers of the connector H—1 have been rotated past the normal set of bank contacts, the original energizing circuit of the slow-acting relay 604 is opened. However, the relay 604 is not deenergized until the termination of the first series of impulses. This result is due to the fact that, at each retraction of the armature of the line relay 607, a circuit is closed for the relay 604 from ground, through battery, armature 620 and its lower contact, front contact and armature 615, winding of relay 604 and front contact and armature 617 to ground.

By the deenergization of the relay 604 at the end of the first series of impulses, the circuit of the slow-acting relay 601 is opened at the armature 614, and a circuit is closed at the armature 616 which extends from the battery, by way of conductor 662, the winding of relay 708, conductor 651, bank contact 640, wiper 630, the front contact and armature 608, and the front contact and armature 617 to ground. The relay 708 is energized over this circuit and operates to open the locking circuits of the certain relays in the group RG—5 at the armature 725, to close its locking circuit at the front contact of the armature 725 to ground on the conductor 650, which has been grounded previously by the operation of the relay 606.

Returning now to the operation of the code-sending switch CD—1, when the wipers 555 to 558, inclusive, are brought into engagement with the bank contact set which includes the contact 563, as previously described, a circuit is completed which extends from ground by way of the armature 427 and its front contact, the front contact and the armature 424, the common conductor 462, wiper 512, bank contact 516, conductor 466, bank contact 563, wiper 556, and through the winding of the relay 501 to battery.

The relay 501 is energized over the above circuit and operates, as before, to open the circuit of the stepping magnet 534 at the armature 505 and to open the circuit of the slow-acting relay 532 at armature 506. The slow-acting relay 532 is deenergized to open the circuit of the slow-acting relay 531, which also retracts its armature. As a result of the latter operation, the stepping magnet 534 is operated to open the circuit of the interrupter relay 533, which retracts its armature to open the circuit of the stepping magnet 534. The magnet 534 is thus deenergized to advance the switch wipers 555 to 558, inclusive, into engagement with the next set of bank contacts. As a result of this operation, the circuit of the relay 501 is opened and this relay retracts its armatures.

The deenergization of the relay 501 opens the circuit of the stepping magnet 534 and closes a circuit for the slow-acting relay 532. The relay 532 is energized and operates to establish a circuit for the relay 531. The latter relay, upon being energized, reestablishes the circuit of the stepping magnet 534. The stepping magnet 534 now intermittently operates to advance the wipers 555 to 558, inclusive, until they are brought into engagement with the twenty-fifth set of bank contacts.

During the second advancement of the wipers of the code-sending switch, upon each operation of the stepping magnet 534, the circuit of the repeating relay 500 is opened and this relay retracts its armature to include the battery B, a corresponding number of times, in the circuit of the line relay 607 of the connector H—1. Upon each retraction of the armature 620 of the relay 607, the circuit of the stepping magnet 623 is opened and the magnet operates to advance the wipers 630 to 633, inclusive, into engagement with the bank contact set which corresponds to the number of impulses sent over the trunk line, as determined by the second movement of the wipers of the code-sending switch CD—1. It will be assumed that this contact set includes the bank contact 641.

When the wipers of the connector H—1 are brought into this position, no more impulses are sent over the trunk line until the slow-acting relays 532 and 531 of the code-sending switch CD—1 are deenergized. During the advancement of the switch wipers to their second position, when the wiper 631 engages the twelfth, thirteenth and fourteenth set of bank contacts, a circuit is completed for the relay 603. The relay 603, upon being energized, closes a circuit for the slow-acting relay 601 at the armature 611, at the armature 612 prepares a circuit for maintaining itself energized, and at the armature 613 removes battery from the conductor 661. During the interval that the slow-acting relays 532 and 531 are deenergizing, the slow-acting relay 603 in the connector H—1, which has been maintained energized by the operation of the armature 620 of the line relay 607, retracts its armatures, thereby opening the circuit of the slow-acting relay 601 at the armature 611 and, at the armature 613, completing a circuit which extends from the battery by way of the back contact and the said armature, the conductor 661, through the winding of relay 705, conductor 657, bank contact 641, wiper 630, the front contact and armature 608 to ground by way of the front contact and armature 617. The relay 705 is energized over this circuit and operates to establish a locking circuit for itself at the armature 719 from ground, through front contact and armature 619, conductor 650, armature 719 and its front contact, winding of relay 705, conductor 661, back contact and armature 613 and battery to ground, and to prepare a circuit at the armature 720 for short-circuiting the relay 700.

As previously described, the code-sending switch CD—1 is stepped around to its twenty-fifth position after the termination of the second series of impulses. The wipers of the connector switch H—1 are also stepped in synchronism with the wipers of the code-sending switch CD—1 and are brought to rest in engagement with their twenty-fifth set of contacts.

In the code-sending switch CD—1, the operation of the wipers 555 to 558, inclusive, to their twenty-fifth set of bank contacts opens the circuit of the relay 527 and also the energizing circuit of the slow-acting relay 525. The relay 527 immediately retracts its armature. By reason of the peculiar construction of the armature 539, previously described, this armature vibrates for an interval of time, thus alternately closing the circuits of the slow-acting relays 526 and 525. For the reason explained previously, the relay 525 is the first to retract its armature. The deenergization of the relay 525 prepares a circuit for the relay 502.

Another result of the switch wipers of the code-sending switch CD—1 being brought into engagement with the twenty-fifth set of bank contacts is that a circuit is completed extending from ground by way of the wiper 555, the bank contact 560, and through the winding of the relay 529 to battery. The relay 529 operates to open another point in the energizing circuit of the relay 525 at the armature 544 and to close the circuit of the relay 502 at armature 545. Upon being energized, the relay 502 operates to establish another circuit for the relay 528 at the armature 508, and to close a circuit at the armature 507 which extends from ground by way of the said armature and its front contact, wiper 511, bank contact 515, conductor 460, and through the winding of resistor 431 to battery. This circuit serves to short-circuit the relays 420 and 421. Consequently, these relays retract their armatures. The relay 420, upon retracting its armatures, opens its locking circuit at armature 423, also removes ground from the common conductor 462 at the armature 424, and at the armature 425 removes one ground connection from the conductor 464. The deenergization of the relay 421 causes this relay to open its locking circuit at the armature 426 and to restore certain other circuits to normal.

In the connector switch H—1, the relay 602 retracts its armature because of the fact that the repeating relay 500 is retained energized for an interval after the wipers of the code-sending switch CD—1 engage the twenty-fifth set of bank contacts. Upon retracting its armature, the relay 602 closes a circuit which extends from ground by way of the back contact and the armature 610, conductor 660, armature 726 and its front contact, the front contact and armature 720, and through the winding of the resistor 712 to battery. This circuit serves to shunt out the relay 700 which retracts its armature. The latter operation opens the circuit of the supervisory lamp 715 and closes a circuit for the supervisory lamp 717. By reason of these changes in supervisory signals, the dispatcher is apprised of the change in position of the contactor 445 in the substation.

Returning now to the operation of the code-sending switch CD—1, the slow-acting relay 526 is finally deenergized, and it opens the circuit of the relay 500 at the armature 537, and at armature 538 opens the circuit of the relay 530, and at armature 580 removes the battery B from the line circuit. The deenergization of the relay 530 opens the circuit of the slow-acting relay 532 at the armature 546 and, at the armatures 547 and 548, completes a circuit which extends from ground by way of the armature 548 and its back contact, through the winding of the stepping magnet 534, the armature 547 and its back contact, the twenty-fifth bank contact, with which the wiper 558 is in engagement, and the said wiper, and thence to the battery by way of the back contact and the armature 552. The stepping magnet 534 is energized over this circuit and operates to restore the wipers 555 to 558, inclusive, to their normal positions, whereupon the circuit of the magnet 534 is opened and its operation ceases.

As a result of the wipers of the code-sending switch being brought to their normal position, the circuit of the relay 529 is opened and this relay retracts its armatures to open the circuit of the relay 502. The slow-acting relay 532, upon retracting its armature, opens the circuit of the slow-acting relay 531 which is also deenergized. The relay 502, upon retracting its armatures, opens the circuit of the relay 528 at the armature 508 and, at the armature 507, removes the shunt from the circuit of the relay 421. It will be remembered that the relay 422 is now in an operated position and, consequently, the relay 421 is energized to establish a locking circuit for itself at the armature 426. The operation of the other armatures of the relay 421 is without effect at this time as the relay 420 is inert. The deenergization of the relay 528 in the code-sending switch CD—1 merely restores certain circuits to their normal condition. The deenergization of the relay 500, which occurred immediately after the deenergization of the slow-acting relay 526, opens the circuit of the line relay 607 of the connector switch H—1.

As the circuit of the relay 607 is opened, this relay is deenergized to open the circuit of the slow-acting relay 605. Upon retracting its armatures, the relay 605 closes a circuit for the stepping magnet 623 which extends from battery by way of the wiper 632, the twenty-fifth bank contact, the back contact and the armature 624, the back contact and the armature 618, through the winding of the stepping magnet 623 to ground. The stepping magnet 623 operates to restore the wipers 630 to 633 to their normal position.

In the above described manner, the apparatus is released following the sending of the supervisory signal to the dispatcher, notifying him of the automatic operation occurring in the substation.

It will be noted that the supervisory signal 717 is not actuated immediately after the two series of impulses which causes its selection. It is operates when the wipers of the connector H—1 are brought to their twenty-fifth position and remain there for an interval. By this circuit arrangement, false operation of the supervisory signals is prevented, because, should either the switch CD in the substation or the connector switch H—1 in the dispatcher's office get out of synchronism with the other, the wipers of each of the switches will not be in their twenty-fifth position simultaneously. Consequently, the supervisory signal will not be operated, but the alarm lamp 773 will be operated. The dispatcher seeing no change in supervisory signals will operate the checking key with the results described subsequently.

It will be noted that the relay 700 is energized in a circuit which includes the armature of relay 705, the armature of relay 710 and the conductor 660, and that the by-pass circuit for the battery of relay 700 is completed through the armature 720 of the relay 705, the armature 726 of relay 708, and the conductor 660. It will be noted that both of these circuits, which are controlled by the received supervisory signals, are completed through the armature 610 and its back contact. The relay 602, however, is energized through the contacts of the switch wiper 633 and the front contact and armature 621 of relay 606. The relay 606, as described above, is periodically energized and deenergized as the code signals are received so that the circuit for relay 602 is periodically opened and closed. Since the relay 602 is a slow-to-operate relay, however, it will not deenergize during the intervals while the relay 606 is deenergized and the circuit of the relay 602 is opened at armature 621. The supervisory circuit to the relay 700 or its battery through the armature 610 is held open at the latter which is disengaged from its back contact during the period while the code signals are received. At the end of the code-receiving period, the switch 633 engages its twenty-fifth contact and opens the circuit for the relay 602.

If the transmitter has remained in synchronism with the receiver, the switch wiper 633 will engage its twenty-fifth contact simultaneously with the transmitter at the remote station and a pause will occur at this instant. This pause will be sufficiently long to permit the relay 602 to deenergize, and the armature 610 will engage its back contact, completing the circuit prepared by the code-selecting relays for the relay 700, as traced above.

If, on the other hand, the switch 633 has fallen out of step with the remote transmitter, being ahead thereof, it will reach the twenty-fifth contact before the transmitter does and, without pausing at this position, will be stepped ahead to the first position by the next impulse received, completing a circuit for the relay 602. No pause will occur at the twenty-fifth position in this case, and the selecting circuit will not be completed. Similarly, if the switch 633 drops behind the transmitter and is not on the twenty-fifth contact when the pause occurs, relay 602 will not energize when the switch reaches its twenty-fifth contact inasmuch as it will step over the twenty-fifth contact to the first contact before the relay 602 has a chance to drop out.

It will be noted also that, upon the receipt of the first impulse and energization of relay 606, an energizing circuit is completed over the conductor 649 to the relay 707 which, thereupon, locks itself through armature 771 and completes a circuit at armature 772 for the alarm lamp 773, to indicate to the operator that a supervisory signal is being received.

By this circuit arrangement, also, the mere opening of the trunk line comprising conductors 591 and 592 after the secondary selection has occurred will not cause a false operation, due to the fact that the relay 602 is not deenergized until the connector pauses at the twenty-fifth position and then only.

In the same manner as above described, any change in position of any of the contactors, or other apparatus units, causes the finder switch F—1, the code-sending switch CD—1 and the connector switch H—1 to be operated to control the actuation of the supervisory signal.

Each of the contactors or other apparatus units controls relays equivalent to relays 420 to 422, the armatures of which are connected to different points in the finder switch 511 to 514 and complete circuits from these finder switches to different points on the code sender switches 555 to 558. Since the connections to the finder switches and to the code senders determines the code to be sent out and these connections are different for each contactor or apparatus unit, operation of any one of these units will cause the transmission of a code individual to that unit.

Special provisions have been made whereby the load dispatcher is apprised of the load on the substation. This arrangement comprises a Kelvin balance ammeter A which is connected to an ammeter shunt in a main bus 440 of the substation. The details of the balance is shown in the "Standard Handbook for Electrical Engineers", sec. 3.67, 5th edition, McGraw-Hill Company. The Kelvin balance operates in a well-known manner to shift the movable contact member 433 to various positions in accordance with the load on the substation.

In order to briefly describe the operation, it will be assumed that the movable contact member 433 is in engagement with the stationary contact members 480 and 481. In this position, a circuit is completed extending from ground by way of the contact member 433, contact member 481, and through the winding of the relay 450 to battery. The relay 450 is energized over this circuit and, upon operating, establishes a locking circuit for itself at armature 460 to ground.

When there is a change in load across the busses, the contact member 433 is operated, and it will be assumed that this contact member is moved into engagement with the contact members 482 and 483. As a result of this operation, a circuit is completed for the relays 451 and 452. Upon operating, the relay 451 establishes a locking circuit for itself at armature 462', at this same armature disconnects its original energizing circuit and, at the armature 463', places ground upon the common conductor 462. The energization of the relay 452 serves to switch certain connections to the bank of the code-sending switch CD, as will appear.

The grounding of conductor 462, of course, starts the functioning of the finder switch F—1 and the code-sending switch CD—1. The sending of this code occurs in the ordinary manner, as has been previously described. By these operations, certain relays in the relay groups RG—4 and RG—5 at the dispatcher's office are energized and locked in that position. It will be assumed that these relays are the relays 711 and 706. When the group selecting relay 711 of the primary selecting group RG—5 is energized, a circuit is momentarily closed by the operation of the relay 601 of the connector switch H—1 for the relay 738. The relay 738, upon operating, opens the locking circuit in that one of the relays, such as relays 735, 736 and 737 which may be energized, thus causing this relay to retract its armatures. This operation opens the circuit of certain load-indicating lamps which may be lighted.

Now, at the end of the selecting operation, when the wipers of the connector switch H—1 are in engagement with their twenty-fifth set of bank contacts, a circuit is closed in the usual manner for energizing the relay 735. This relay operates to establish a locking circuit for itself at armature 739 and, at the armature 740, closes a circuit for the load-indicating lamp 750. This lamp will now continue to burn, indicating to the dispatcher that there is a certain load on the substation, until a change in load occurs, whereby it is extinguished by a code being sent back and another lamp lighted. The operation of the alarm relay 770, of course, calls the attention of the load dispatcher to the change in load in the same manner as has been previously described. The dispatcher then operates the key K—1 to stop the operation of the alarm.

At the substation, the energization of the relay 502, in addition to other results, closes a circuit for shunting the relays 450 and 451. The relay 450, upon retracting its armature, opens its locking circuit and also removes ground from the common conductor 462. The deenergization of the relay 451 is without particular function. Upon the deenergization of the relay 502, which occurs upon the release of the connection, the short-circuit is removed from the winding of the relay 451 and, as the contact maker 433 is in engagement with the contact 483, the relay 451 is again energized. This relay operates to establish a locking circuit for itself at armature 462', at this same armature disconnects its original energizing circuit and, at the armature 463', prepares a circuit for grounding the common conductor 462.

Now, whenever any change in load occurs, the contact maker 433 is moved in one direction or the other, depending upon the change, and the relay 450 is energized, thus causing the code to be sent back to the dispatcher's office to apprise him of the change. It will be seen that the contacts, such as 480 and 482, of the Kelvin balance are connected in pairs to the banks of the finder switch. It is thus necessary to send back two codes for each position of the finder switch wipers. This result is obtained by the relay 452. If the relay 452 is energized, one code is sent back. If the relay 452 is deenergized, another code is sent back. The relay 452, at its various armatures, alters the connection between the banks of the finder switch F—1 and the banks of the code-sending switch CD—1.

It will be apparent that the contact member 433 may move over more than one contact member. However, in this instance, the relay 450 or 451, as the case may be, is energized to start the sending of the code. The position of the contact member 433 itself determines the code to be sent back so that there is no faulty operation.

It will be remembered that, in the preceding description, the relay 450, upon first energizing, did not send back a code. In practice, however, as soon as the ammeter A is connected, the contact member 433 will move over several contact members in order to assume a certain position indicative of the load. Thus, a code will be sent back to indicate to the dispatcher the load on the substation. Any change in load on the substation causes a corresponding change in the position of the contact member 433 and the dispatcher is apprised of the load in the manner described.

It will now be assumed that the contactor 445 at the substation is open and that the load dispatcher desires to close it. In order to accomplish this result, the dispatcher operates the double-throw key K in a direction to momentarily close the springs shown on the right.

The operation of the key K closes a circuit which extends from ground by way of the spring 100 and its working contact, through the winding of the relay 106, conductor 183, the front contact and armature 713, and thence to the battery. The relay 106 is energized over this circuit and operates to establish a locking circuit for itself at the armature 173 over a path extending from ground by way of spring 177 and its resting contact, armature 173 and its front contact, through the winding of relay 106, conductor 183, and thence to battery by way of the front contact and armature 713. The operation of the armature 172 of the relay 106 closes a circuit for the monitor lamp 174. This lamp remains lighted through the sending operation, even after the key K is restored to normal, in order to inform the dispatcher that the desired code is being sent. Another result of the energization of the relay 106 is that, at the armature 103, a circuit is completed which extends from ground by way of armature 103 and its working contact, through the winding of stepping magnet 109 of the finder switch F, armature 132 and its back contact, and thence to the battery by way of the back contact and the armature 120. As the stepping magnet 109 interrupts its own circuit, it operates as a buzzer to advance the switch wipers 123 to 126, inclusive, until they are brought into engagement with the bank contacts 127 to 130, inclusive, which is the contact set associated with the key K in the finder switch F.

When the switch wipers are brought into engagement with this set of bank contacts, a circuit is closed which extends from ground through the winding of the relay 108, by way of the common conductor 134, which is common to all the keys in the group, the front contact and armature 101, bank contact 130, wiper 126 and the winding of relay 113 to battery. The relay 113 is energized over this circuit, and, upon operating, opens the circuit of the stepping magnet 109, thus stopping the operation of the finder switch, and closes a circuit for the relay 111 extending from battery by way of the armature 120 and its front contact, through the winding of the relay 111, the bank contact with which wiper 160 is in engagement, and the said wiper to ground. At the armature 121, a circuit is closed which extends from ground by way of the armature 121 and its front contact, through the winding of the slow-acting relay 143, and thence to battery by way of the armature 152 and its back contact. The relay 111, upon being energized, closes a circuit for the slow-acting relay 110 at its armature 117.

The armature 117 of the relay 111 is constructed in a manner similar to the armature of the relay 527 of the code-sending switch CD—1 and, consequently, when the relay becomes deenergized, the armature 117 vibrates for an interval afterwards. The relay 110, upon operating, at the armature 115 closes a circuit for the relay 140 and, at the armature 116, establishes a circuit which extends from ground by way of the armature 121 and its front contact, through the winding of the repeating relay 144, the front contact and the armature 116 and to battery by way of the armature 152 and its back contact. The operation of the armature 122 of the relay 110 prepares a circuit for placing the battery B—2 in the trunk line circuit. The repeating relay 144, upon operating, at its armature 154, closes a bridge across the conductors 180 and 181, including the battery B—3, extending to the substation whereby the line relay 200 of the connector H is energized.

The line relay 200, upon operating, closes a circuit for the slow-acting relay 202 in parallel with the stepping magnet 207. The stepping magnet 207 is energized to place its associated pawl in position to actuate the switch shaft. The slow-acting relay 202, upon being energized, closes a circuit for the slow-acting relay 203. The latter relay operates to energize the slow-acting relay 206. The operations of these relays have the same functions as described in connection with the connector switch H—1.

Returning now to the operation of the code-sending switch CD, the relay 140, upon operating, at its armature 148 closes a circuit for the slow-acting relay 141 from ground through battery, armature 148 and its front contact, winding of relay 141, and back contact and armature 156 to ground. The relay 141, upon attracting its armature, establishes a circuit for the slow-acting relay 142. The latter relay, upon being energized, closes a circuit which extends from ground by way of the armature 155 and its back contact, the front contact and the armature 151, the front contact and the armature 153, through the winding of the magnet 146, by way of the wiper 162 and its associated bank contact, and thence to battery by way of the armature 148 and its front contact. The stepping magnet 146 is energized over this circuit and operates to place its associated pawl in position to actuate the switch shaft and also to open the circuit of the relays 144 and 143 at the armature 152. The deenergization of the relay 144 opens the circuit of the line relay 200 of the connector switch H at the substation and completes a new circuit therefor with the battery B—2 included therein. The slow-acting relay 143, upon being deenergized, opens the circuit of the stepping magnet 146, which is also deenergized, to reestablish the circuit of the relays 143 and 144, and to advance the switch wipers 160 to 163, inclusive, into engagement with their first set of bank contacts. The stepping of the code-sending switch CD continues under the control of the slow-acting relay 143 until the wipers of the switch are brought into engagement with the contact set which includes the contact 165. When this occurs, a circuit is completed which extends from ground by way of the armature 102 of the relay 106 and its front contact, the wiper 125, the bank contact 129, the bank contact 165, the wiper 161, and through the winding of the relay 145 to the battery.

The relay 145 is energized over this circuit and, upon operating, it opens the circuit of the stepping magnet 146 at the armature 155, at the front contact of this armature prepares another circuit for the magnet and at the armature 156 opens the circuit of the slow-acting relay 141. The rotation of the switch, of course, ceases.

The slow-acting relay 141, upon being deenergized, opens the circuit of the slow-acting relay 142. After a short interval, the slow-acting relay 142 retracts its armature and closes a circuit which extends from ground by way of the armature 155 and its front contact, the back contact and the armature 151, the front contact and the armature 153, through the winding of the stepping magnet 146, the wiper 162 and the bank contact with which the said wiper is in engagement, and thence to battery by way of the front contact and the armature 148. The stepping magnet 146 operates to attract its armature, thereby placing the pawl in actuating position and opening the circuit of the slow-acting relay 143 and also the circuit of the relay 144.

In accordance with the first operation of the code-sending switch CD, the battery B—2 is placed a plurality of times in the circuit with the polarized line relay 200 of the connector switch H. This relay retracts its armature a plurality of times in response thereto, in a manner similar to that already described. As a result of the retractions of the armature 209, the circuits of the slow-acting relay 202 and the magnet 207 are opened. The deenergizations of the magnet 207 serve to advance the switch wipers 225 to 228, inclusive, into engagement with the bank contact set which corresponds to the number of impulses sent over the trunk line and, consequently, the positions of the wipers 160 and 163, inclusive, of the code-sending switch CD. At the first off-normal step of the switch, the relay 201 is energized to close the circuit of the slow-acting relay 205 and grounds on the conductor 260. The operation of the relay 205 removes battery from conductor 269. It will be assumed that the bank contact set to which the wipers 225 to 228, inclusive, are stepped includes the bank contact 230.

During the interval that the slow-acting relays 141 and 142 in the code-sending switch are being deenergized, the slow-acting relay 203 of the connector switch H, which has been maintained energized by the continued operation of the armature 209 is deenergized. As a result of this operation, a circuit is completed which extends from ground by way of the armature 211 and its front contact, armature 221 and its front contact, wiper 225, bank contact 230, conductor 262, through the winding of the relay 306, conductor 271, and to battery by way of the armature 215 and its back contact. The relay 306 is energized over this circuit and operates to close a locking circuit for itself at the armature 322 to ground on the conductor 260.

Adverting to the operation of the code-sending switch CD, the deenergization of the slow-acting relay 142 closes a circuit for the magnet 146 which is energized to place its associated pawl in actuating position and to open the circuit of the slow-acting relay 143 and also the circuit of the repeating relay 144. The slow-acting relay 143, upon being deenergized, opens the circuit of the stepping magnet 146, which is deenergized. The retraction of the armature of the magnet 146 advances the switch wipers another step and also closes the circuit of the interrupting relay 143 and the repeating relay 144. By the movement of the switch wipers, the circuit of the relay 145 is opened and this relay retracts its armatures to open the circuit of the magnet 146 and to close the circuit of the slow-acting relay 141. The energization of the relay 141 closes the circuit of the relay 142. The operation of the relay 142 again starts the operation of the stepping magnet 146.

The magnet 146 is now intermittently operated to advance the wipers 160 to 163, inclusive, into engagement with the bank contact set, which includes the contact 166. A circuit is now closed which extends from ground by way of the armature 102 of the relay 106 and its front contact, armature 119 of the relay 108 and its front contact, wiper 124, bank contact 128, bank contact 166, wiper 161, and through the winding of the relay 145 to battery. The relay 145 is energized to momentarily stop the operation of the switch wipers in the same manner as before described.

The repeating relay 144 operates to alternately place the batteries B—2 and B—3 in the circuit at the line relay 200 of the connector H in the same manner as before. The line relay 200 retracts its armature a plurality of times to control the operation of the stepping magnet 207 in advancing the wipers 225 to 228, inclusive, into engagement with the proper bank contact set, which, it will be assumed, includes the bank contact 231. At the termination of this series of impulses, the slow-acting relay 204, which has been energized while the switch wipers were being rotated past the twelfth, thirteenth and fourteenth set of bank contacts and has been maintained energized by the operation of the line relay 200, is deenergized and a circuit is closed which extends from ground by way of the front contact and the armature 211, the armature 221 and its front contact, the wiper 225, the bank contact 231, the conductor 268, through the winding of the relay 303, the conductor 270, and the armature 219 and its front contact to battery. The relay 303 is operated over this circuit and attracts its armatures to establish a locking circuit for itself at the armature 350 from ground, armature 210, over conductor 260, armatures 308 and 350, winding of relay 303, conductor 270, armature 219 and its back contact and battery to ground, and to prepare a circuit at the armature 319 for the relay 404 in the substation.

Going back now to the operation of the code-sending switch CD, the slow-acting relays 141 and 142 operates, as before, and the magnet 146 is operated after an interval to advance the wipers 160 to 163, inclusive, into engagement with the twenty-fifth set of bank contacts.

When the wipers 160 to 163, inclusive, are brought into engagement with the twenty-fifth set of bank contacts, the circuit of the stepping magnet 146 is opened and its operation ceases temporarily. A circuit is also completed which extends from ground by way of the wiper 160 and its associated twenty-fifth bank contact, and through the winding of the relay 112 to battery. The relay 112 is energized to prepare a circuit for the stepping magnet 109, the function of which will be described subsequently. Another result of the rotation of the wipers to the twenty-fifth position is that the circuit of the relay 111 is opened. The relay 111 is immediately deenergized to cause its armature 117 to vibrate. The relay 110 is thus maintained energized for an interval after the relay 11 is deenergized.

In the same manner as before described, the wipers of the connector switch H are brought into engagement with their twenty-fifth set of bank contacts. Now, during the interval that the relay 110 in the dispatcher's office is maintained energized, the slow-acting relay 205 in the connector switch H at the substation is deenergized and a circuit is completed which extends from battery by way of the back contact and the armature 220, the conductor 269, the conductor 372, through the winding of the relay 404, the conductor 371, the armature 319 and its front contact, and thence to ground, by way of the front contact and armature 323. The relay 404 is operated over this circuit and closes a circuit at its armature 416 for the contactor 445 and, at the armature 415, closes a circuit for the relays 420 and 421.

The contactor 445 has been assumed to be open, its energization serves to close it. In the same manner as before described, the dispatcher receives a supervisory signal back in order to notify him that the desired operation has taken place.

There is a slight difference in the operation in this instance, however, inasmuch as the relay 106 is locked energized, when the lamp 717 is lighted by the deenergization of the relay 700. The relay 700, upon retracting the armature 713, causes the relay 106 to be deenergized.

The deenergization of the relay 106 opens the operating circuits of the finder switch F and the code-sending switch CD, insuring that the operating code will not be sent to the substation again.

The contact member 415 on the relay 404 at the substation is provided in order that, in case the contactor 445 should already be in its closed position, an answer-back signal will be given to the dispatcher in order to check the supervisory signals.

Energization of the relay 404 completes a circuit over its armature 415 for the relay 420 from ground through the winding of relay 420, front contact and armature 415, front contact and armature 429 and resistance 431 and battery to ground. A code is thus started into operation for indicating that the circuit breaker is closed. Similarly, if a second operation were to be made and the circuit breaker was already opened, an energizing circuit would be completed for the relay 421 similar to the one just traced for the relay 420, and a code indicative of the open position of the circuit breaker would be transmitted.

The locking relay 106 also provides means whereby, if, for some reason or other, the code is not transmitted properly, the operation will occur repeatedly until the corresponding contactor or apparatus unit is operated in the substation. By the conjoint action of the checking contact member 415 of the relay 404 at the substation and the locking relay 106 associated with the key K, provision is so made that, if the answer-back code is not transmitted properly, it will be sent back repeatedly until the proper indication is given to the load dispatcher.

The locking circuit for the relay 106 is completed over the front contact of armature 713. The relay 106 will therefore remain energized until the relay 700 is de-energized, indicative of the proper change at the substation. If now the relay 700 fails to deenergize after the supervisory code has been received, the relay 106, still being energized, will start the control code into operation in exactly the same manner as already described, thereby repeating the control code. This will continue until the relay 700 de-energizes and opens the locking circuit of the relay 106.

Returning now to the operation of the code-sending switch CD, it will be remembered that the circuit of the slow-acting relay 110 is finally opened by the cessation of the vibration of the armature 111. The relay 110, upon being deenergized, opens the circuit of the slow-acting relay 140 at the armature 115, at the armature 116 opens the circuit of the relay 144, at armature 122 disconnects the battery B—2 from the back contact of the armature 154, and at the armature 114 closes a circuit, which extends from the battery, by way of the front contact of the armature 118 and the said armature, the armature 114 and its back contact, the back contact and the armature 132, through the winding of the stepping magnet 109, the front contact and the armature 103 to ground. The magnet 109 is operated over this circuit to advance the wipers 123 to 125, inclusive.

The slow-acting relay 140, upon being deenergized, opens the circuit of the slow-acting relay 141 and closes a circuit which extends from ground by way of the armature 147 and its back contact, through the winding of the stepping magnet 146, the armature 149 and its back contact, the bank contact with which wiper 163 is in engagement and the said wiper, and thence to battery, by way of armature 152 and its back contact. The magnet 146 operates to restore the wipers 160 to 163, inclusive, to normal position. By this operation, the circuit of the relay 112 is opened and this relay is deenergized to open the circuit of the stepping magnet 109 of the finder switch F whereby the rotation of the wipers of the finder switch ceases. The slow-acting relay 141, upon retracting its armatures, opens the circuit of the slow-acting relay 142, which is also deenergized. In the above manner, the connection is released in response to the transmitting of the sending operation.

The reason that the finder switch F is given a number of steps at the end of the code-transmitting operation is to allow the calls to be evenly distributed over the group of keys. To explain more fully, assuming that another relay, such as 106, is operated in addition to the said relay, by the momentary operation of another key K, were it not for the provision mentioned, the code corresponding to the operated relay would be transmitted indefinitely until the proper answer-back signal is recorded on the lamps, and there would be no actuating code sent out for the other relay, which was operated. By means of the circuit arrangement shown, this difficulty is obviated and one transmitting operation cannot indefinitely tie up the remaining operations.

The relay 113 is, of course, deenergized as soon as the switch wiper 126 is rotated from engagement with the back contact 130 and the circuit of the stepping magnet 109 is closed. If no other relay, such as 105 or 106, is operated, the finder switch F may again rotate the wipers 123 to 126, inclusive, into engagement with the bank contacts 127 to 130, inclusive.

The deenergization of the relay 144 opens the circuit of the polarized line relay 200 and this relay retracts its armature to initiate the release of the connector switch H, which occurs in the ordinary manner described in connection with the connector switch H—1.

In case the dispatcher momentarily operates the key K in the other direction, thus operating the springs shown at the left, the relay 105 is locked in its energized position and the code for opening the contactor is sent out, although the wipers 123 to 126, inclusive, of the finder switch F are brought into engagement with the bank contacts 127 to 130, inclusive. The difference in the code is due to the fact that the common relay 108 is not energized at this time, and consequently, the wipers of the code-sending switch CD are first stopped in engagement with the bank contact set which includes the contact 164.

The dispatcher is also provided with a checking key whereby it is possible for him to send out a certain code which will operate the relays 401, 402 and 403. These relays carry contacts for closing the circuits of all relays, such as relay 420 and 421, in the substation. Consequently, when the checking code is sent out, all the apparatus units codes will be sent back to the dispatcher in order to check his supervisory signals.

Under certain conditions, it will be seen that it may be desirable to operate a plurality of contactors, or other apparatus units, in the substation simultaneously in order to take care of standard operations or emergency conditions. To this end, I have provided a relay 435 which is adapted to close circuits at the armatures 432, 434, 433' for the contactors that it is desired to operate. The relay 435 is energized in the same manner as the relay 404. The operation of this relay and the contactors controlled by it will be apparent without further explanation.

It will be seen that the provision of the locking relays, such as 105 and 106, also renders it impossible to send an unnecessary code for the reason that, if the dispatcher should inadvertently throw the key K in the same direction as it had been thrown just previously, the opposite relay 105 or 106, as the case may be, would not be energized and no operation would occur. As no monitor lamp is lighted, the attention of the dispatcher is called to his mistake.

Under certain conditions, the dispatcher may find it desirable to release the connection in case he inadvertently operates a key or, for any other reason, desires to stop the sending of the code. In order to accomplish this result, it is only necessary for the dispatcher to operate the key momentarily in the opposite direction. To describe this operation, it will be assumed that the key K has been thrown to the right and that the relay 106 is locked energized. To stop the sending operation, the dispatcher will throw the key to the left, thereby opening the locking circuit of the relay 106, which deenergizes, and allows the sending apparatus to be restored to normal conditions in the usual manner. The de-energization of the relay 106 opens the circuit of the stepping magnet 109 at the armature 103 and prevents further stepping of the selector switch, opens the energizing circuit of the relays 108 and 113 at armature 101 and of the relay 145 at armature 102. De-energization of the relay 113 opens the energizing circuit of the relay 111 at armature 120 and the energizing circuit of the relays 144 and 143 at armature 121.

The relay 111 is de-energized and opens the energizing circuit of the relay 110 after an interval of time, during which the vibrator 117 periodically opens and closes the circuit of the relay 110. After an interval of time, the slow-release relay 110 opens the circuit of the relay 140 at armature 115 and a point in the line circuit at armature 122. The relay 140 de-energizes to open the energizing circuit of relay 141 at armature 148 which, in turn, opens the energizing circuit of the relay 142 at armature 150. A circuit is now completed for a stepping magnet 146, from ground, through battery, back contact and armature 152, wiper 163, back contact and armature 149, winding of relay 146, back contact and armature 147, to ground. The energization of the stepping magnet opens its own circuit at armature 152. The stepping magnet thus vibrates to step the switches of the code sender back to their normal position. In this manner, the apparatus is restored to normal. The relay 105 is not energized at this time for the reason that the relay 700 is energized and there is no battery connected to the winding of the relay 105. In the above manner, the sending apparatus including equipment at the dispatcher's office and the substation is restored to normal conditions.

It will be seen that there has been shown in the system so far described a trunk line comprising four conductors extending between the dispatcher's office and the substation. These conductors may be reduced to two by using the method illustrated in Fig. 8. This circuit arrangement discloses a duplexing method whereby signals may be sent simultaneously over two conductors in either direction. The operation is somewhat similar to the ordinary differential duplex used in telegraph systems. However, to this ordinary duplex circuit has been added arrangements for automatically balancing the artificial line, upon which the duplex operation is dependent, at both the dispatcher's office and the substation.

In the description, it will be assumed that the apparatus shown on the left is located in the dispatcher's office, while the apparatus shown on the right is located in the substation.

The dispatcher's office and the substation are connected by means of two trunk conductors 800 and 801. The relay 805 corresponds to the line relay 607 of the connector switch H—1. The relay 808 corresponds to the relay 110 of the finder switch F in the dispatcher's office. The relay 809 is similar to the relay 605 of the connector switch H—1. The relay 810 corresponds to the repeating relay 144 of the code-sending switch CD. At the substation, the relay 861 corresponds to the relay 200 of the connector switch H, the relay 859 corresponds to the relay 202 of the connector H and the relay 860 is similar to the relay 528 in the code-sending switch CD—1. The relay 857 corresponds to the repeating relay 500 in the finder switch F. The relays 811, 812, 854 and 856 are polarized relays, the armatures of which remain normally in the position shown.

With the above understanding, the operation of the invention will first be described by explaining the operation of the system, considering only the sending of the signals in either direction and in both directions simultaneously. Assuming that the code-sending switch CD at the dispatcher's office is operating to transmit a code, when the repeating relay 810 is energized, a circuit is closed extending from the negative pole of the battery 844 by way of the front contact and armature 823, the back contact and armature 819, through the upper winding of differential relay 806, through the winding of polarized relay 812, conductor 800, through the winding of the polarized relay 854, the upper winding of differential relay 855, armature 885 and its back contact, armature 879 and its back contact, through resistor 890, trunk conductor 801, normally closed springs controlled by armature 819, and thence to the positive pole of the battery 844. A circuit in multiple with that above traced extends through the lower winding of the differential relay 806 by way of armature 836 and its front contact, through resistor 843, normally closed springs controlled by armature 819, and to the positive pole of the battery 844.

The circuits above mentioned for the upper and lower windings of the differential relay 806 are balanced by means of the contact maker 837 which controls the operation of the relays, such as 815 and 816, whereby there is equal current flowing in both windings of the differential relay and, hence, it does not operate.

The polarized relay 812 is energized over this circuit and operates its armature in such a direction as to open the circuits shown. However, this operation is without function at the present time. At the substation, the relay 855 is energized as practically all the current goes through its upper winding. Whatever portion is shunted through its lower winding flows in such a direction as to assist the current in its upper winding. The relay 855 is thus caused to attract its armature 883 to close a circuit for the line relay 861 of the connector switch H. The polarized relay 854 is, of course, energized over the above-described circuit. However, under these conditions, the circuit through the springs shown is not broken as the current flows in the wrong direction. The line relay 861 is thus actuated and may control the connector switch H in accordance with the impulses produced by the operation of the repeating relay 810.

In a manner similar to that described above, the repeating relay 857 at the substation controls the operation of the line relay 805 at the dispatcher's office, the polarized relays 812 and 854 being actuated in the opposite direction, due to the current being supplied from the battery 899. Consequently, the springs shown on the polarized relay 812 are not opened, while the springs shown on the relay 854 are opened.

It will now be assumed that both the code-sending switch CD at the dispatcher's office and the code-sending switch at the substation start to send simultaneously. The relays 810 and 857 are thus energized together. The current flows over the circuit above traced including the upper windings at the relays 806 and 855 and the trunk conductor 801, and also through the lower windings of the relays 806 and 855. The currents through the upper windings of these relays neutralize each other. Consequently, the lower windings of these relays operate to attract the armatures 817 and 883. Thus, the operations of the armatures 817 and 883 serve to control connector line relays 805 and 861 to produce the desired operations. As the currents through the upper windings of the relays 806 and 855 and through the windings of the polarized relays 812 and 854 neutralize each other, these polarized relays maintain their armatures in the position shown and circuits are completed for the line relays, as above described.

From the foregoing, it will be seen that it is essential that the circuit including the resistors 843 and 891 and the lower windings of the differential relays 806 and 805, respectively, must be maintained in perfect balance. Otherwise, the differential relay may be operated when it is not supposed to be operated. Ordinarily, the circuit is balanced manually by means of a galvanometer and a contact maker, such as that shown at 837, whereby more or less resistance is placed in the circuit.

As has been mentioned before, the relay 808 corresponds to the relay 110 in the finder switch F. It will be noted that the first time the relay 808 operates, a circuit is closed for the upper winding of the relay 813. The upper winding of the relay 813 is of comparatively low ampere turns and, when energized, is adapted to attract only the armature 830. When the armature 830 operates, a circuit is prepared which extends from ground by way of the back contact and armature 834, armature 830 and its front contact, through the lower winding of relay 813, and through the upper winding of relay 813 to battery. The lower winding of this relay has a large number of ampere turns and, when energized, is adapted to operate the other armature of the relay. It will be noted that, so long as the relay 808 is energized, the lower winding of the relay 813 is short circuited and, hence, has no affect. When the relay 808 deenergizes, which occurs upon the restoration to normal of the code-sending switch CD, the relay 813 immediately attracts its armatures and prepares a circuit for the relay 814. Upon the next operation of the relay 808, the relay 814 is partially energized and prepares a locking circuit for itself at armature 833.

Upon the next deenergization of the relay 808, the relay 814 is immediately energized. Upon the next operation of the code-sender CD, the relay 808 is operated to close a circuit for the upper winding of the relay 813. The relay 813 is closed to prepare a locking circuit for itself at armature 830, and to prepare a circuit at armature 831 for the relay 847. Upon the deenergization of the relay 808, the lower winding of the relay 813 becomes effective and all the relay armatures are operated. As a result of this operation, a circuit is closed at armature 831 for the relay 847 and a circuit is prepared at armature 829 for the relay 814. The relay 847, upon energizing, opens the locking circuit of the relay 814 which is immediately deenergized. The reason that the relay 847 is not energized when the relay 814 first attracts its armatures is that the armature 834 is adjusted to break away from its back contact before the armature 835 engages its front contact and, consequently, the relay 813 is deenergized.

When the connector switch H is operated in response to the operation of the code-sending switch CD, the relay 860 is energized and operates to partially energize the relay 853. The relay 853 is energized and operates to prepare a locking cricuit for itself at the armature 877. When the connector switch H releases, the relay 860 is deenergized and the relay 853 energizes and prepares a circuit for the relay 852. The operation of the relay 852 is similar to the operation of the relay 814, previously described, and occurs responsive to the energization and deenergization of the relay 860.

Upon the next operation of the connector switch H, the relay 853, which has been deenergized by the operation of the relay 852, is again energized and the relay 894 is operated. The relay 894 operates to open the locking circuit of the relay 852, which deenergizes. As the connector switch H is operated at the same time as the code-sending switch CD at the substation, the relays 813 and 853 are energized simultaneously as are the relays 814 and 852. It will be seen that the relay 814, upon being energized, prepares a circuit for the relay 807 at armature 828. It will also be seen that, when the relay 853 is energized, a circuit is prepared for the relay 858 at armature 875.

At the dispatcher's office, when both the code-sending switch CD and the connector switch H—1 therein are inoperative, the relays 808 and 809 are deenergized. Under these conditions, when the relay 814 is energized, a circuit is completed which extends from ground by way of the back contact and armature 849, the back contact and armature 822, the front contact and armature 828, and through the winding of relay 807 to battery. At the substation, at this time, the relay 852 will be energized and, even though the relays 859 and 860 are deenergized, there will be no circuit completed for the relay 858.

The relay 807, upon being energized, at armature 819 disconnects the positive pole of the battery 844 from the trunk conductor 801 and, at the same armature, connects the positive pole of the battery over a circuit which extends through the upper winding of the relay 806, through the winding of polarized relay 812, trunk conductor 800, through the winding of polarized relay 854, through the upper winding of relay 855, armature 885 and its back contact, armature 879 and its back contact, resistor 890, trunk conductor 801, resistor 848, the front contact and armature 820, to the negative pole of the battery 844. A circuit in parallel with the above extends through the lower winding of relay 806, armature 836 and its front contact, through a portion of variable resistor 843, through resistor 848, and thence to the negative pole of the battery 844 by way of the front contact and armature 820. It will be seen that this circuit constitutes a Wheatstone bridge, the upper and lower windings of the relay 806 being two sides of the bridge, the third side including the line conductors 800 and 801 with their associated apparatus, and the fourth side being the variable resistor 843. The polarized relay 811 is connected between two sides of the bridge upon the energization of the relay 807.

It is true that the differential relay 855 at the substation is operated over the above circuit. However, its operation is without effect inasmuch as the relay 854 is operated in such a direction as to open its springs. Thus, there is no circuit completed for the line relay 861.

If the resistance of the line conductors 800 and 801 and the associated apparatus is greater than the resistance of the variable resistor 843 that is connected in the circuit, the polarized relay 811 will be energized and will attract its armatures in one direction, thereby closing the circuit for the motor 845 which will operate the contactor 837 in such a direction as to include more resistance in the third arm of the bridge, which comprises the variable resistor 843. If there is a greater resistance included in the circuit of the variable resistor 843 than there is in the line conductor 801 and the associated apparatus, the current flow in the polarized relay 811 is in the opposite direction, the armatures 826, 825 and 824 are operated in the opposite direction, and the motor 845 operates in a reverse manner to lower the resistance of the variable resistor 843. When the bridge becomes balanced, the operation of the motor ceases.

When the code-sending switch CD at the office is operated again, the relay 813 is energized and the relay 807 is deenergized to reverse the battery connections and to allow the relay 810 to control the circuit in the manner previously described.

At the substation, if the relay 853 is energized at the same time the relays 859 and 860 are deenergized, a circuit is closed for the relay 858. The operation of the relay 858 places the polarized relay 856 across a Wheatstone bridge and the operation of this relay causes the motor 870 to function in the proper manner to raise or lower the resistance of the variable resistor 891.

It will be seen that the balancing of the circuit takes place only when the trunk line is not in use for the transmission of signals and occurs at the dispatcher's office and the substation alternately. In this manner, there is no interference between the two balancing circuits.

My invention is not limited to the particular arrangement of the apparatus described but may be variously modified without departing from the spirit and scope thereof, as set forth in the appended claims.

I claim as my invention:

1. In a signalling system, a first station, a second station, a measuring device at said second station having a plurality of reading positions greater than two, relay means common to all the measuring positions, a receiving device at said first station for said measuring device, a normally non-operating finder switch and common code transmitter for said measuring device, said finder switch having an individual position for each reading position, means responsive to the operation of said measuring device from any one reading position to another reading position for energizing said relay means, means including said relay means and said measuring device for operating said finder switch to a position individual to the reading of said measuring device, means controlled by said finder switch for starting said code transmitter into operation, means including said finder switch and measuring device for operating said code transmitter to transmit a code individual to the reading of said measuring device and means at said first station responsive to said code for operating said receiving device in accordance with the reading of said measuring device.

2. In a supervisory control system, a first station, a second station, a measuring device at said second station having a plurality of indicating positions arranged in groups, common relay means associated with said measuring device, a receiving device at the first station for said measuring device, a finder switch at said second station having an individual position for each group, a code transmitter thereat normally in non-operating condition, means responsive to the movement of said measuring device from any one indicating position to another position for operating said finder switch to the position common to the group of which said new indicating position is one, means including said finder switch and said common relay means for operating said code transmitter to transmit a predetermined code to said first station individual to the one indicating position of the measuring device, and means at said first station, responsive to said code, for operating said receiving device in accordance therewith.

3. In a signalling system, a first station, a second station, a measuring device at said second station having a plurality of indicating positions arranged in groups, a receiver at said first station, a finder switch and a code transmitter at said second station, said finder switch and receiver being normally in a non-operating condition, said finder switch having an individual position for each group of indicating positions, common relay means, means for operating said relay means in response to any change of position of said measuring device for starting the operation of said normally non-operating finder switch, means whereby said finder switch is operated to the position corresponding to the group of which said new position of the measuring device is one, a second common relay means, means whereby said second common relay means is invariably operated in accordance with the different positions in a group, means responsive to the operation of said second relay means and of said finder switch at a predetermined position for operating said code transmitter in accordance with said position and the operation of the second common relay means, to transmit a predetermined code individual to the new position of said measuring device, and means at said first station, responsive to said code, for operating said receiver.

In testimony whereof, I have hereunto subscribed my name this 8th day of October, 1923.

JOHN E. GARDNER.